United States Patent [19]
Faulstich et al.

[11] 3,723,143
[45] Mar. 27, 1973

[54] GLASS COMPOSITIONS FOR ULTRASONIC DELAYED ACTION LINES

[75] Inventors: Marga Faulstich; Norbert Neuroth, both of Mainz, Germany

[73] Assignee: Jenaer Glaswerk Schott & Genn, Mainz, Germany

[22] Filed: Aug. 26, 1971

[21] Appl. No.: 175,340

Related U.S. Application Data

[63] Continuation-in-part of Ser. No. 804,595, March 5, 1969, abandoned.

[30] Foreign Application Priority Data

Mar. 8, 1968 Germany..................P 16 96 064.8

[52] U.S. Cl. ....................106/53, 106/52, 106/54
[51] Int. Cl. .........C03c 3/10, C03c 3/04, H03h 7/30
[58] Field of Search.............. 106/52, 53, 54; 333/30

[56] References Cited

UNITED STATES PATENTS

| | | | |
|---|---|---|---|
| 2,212,879 | 8/1940 | Kalsing et al. | 106/52 |
| 2,214,385 | 9/1940 | Scott et al. | 106/53 |
| 2,702,749 | 2/1955 | Hatner et al. | 106/53 |
| 2,913,345 | 11/1959 | Duncan | 106/52 |
| 3,154,425 | 10/1964 | Hoover et al. | 106/53 |
| 3,178,274 | 4/1965 | Duncan et al. | 106/52 |
| 3,475,704 | 10/1969 | van der Burgt | 333/30 |
| 3,494,354 | 2/1970 | Yokata et al. | 106/52 |

*Primary Examiner*—Helen M. McCarthy
*Assistant Examiner*—M. Bell
*Attorney*—Ralph D. Dinklage et al.

[57] ABSTRACT

Glass compositions for ultrasonic delayed action lines characterized by low temperature coefficient of the ultrasonic travel time and by low internal attenuation of sound waves and transformation temperatures of between 550° and 620° having the following composition:

5 Claims, 1 Drawing Figure

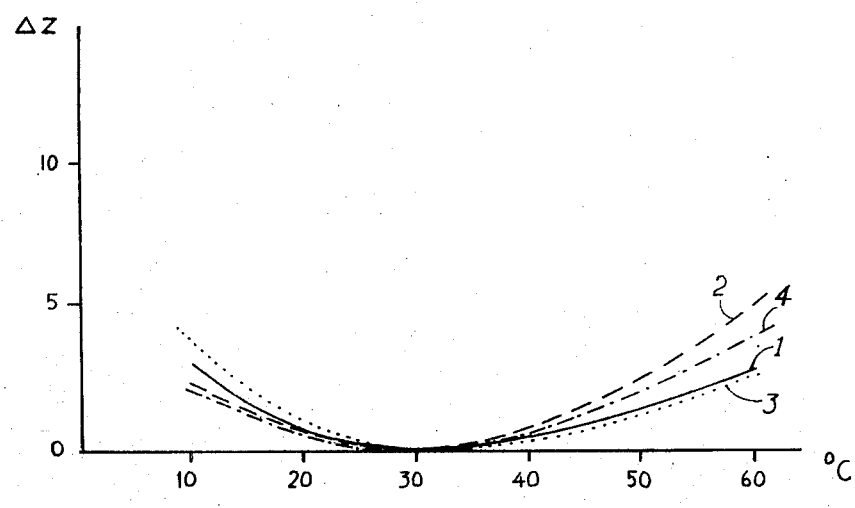

GLASS COMPOSITIONS FOR ULTRASONIC DELAYED ACTION LINES

This application is a continuation in part of application Ser. No. 804,595, now abandoned.

The present invention relates to glass compositions suitable for ultrasonic delayed action lines, and in particular to compositions of glass characterized by low ultrasonic speed temperature coefficients.

It is known in the art that certain types of glass compositions can be used for ultrasonic delayed action lines. The most important requirement of such glasses is that in these glasses in which the velocity of sound changes with temperature in such a way that the propagation time z of the sound is constant in the temperature range of about 10 to 50°C that the relative change amounts to $(1/z)$ $(dz/dT) \leq 1.5 \times 10^{-6}$/°C. In addition, the following are also desirable properties of such glass compositions: short sound paths, i.e., low sound velocity, low mechanical attenuation of sounds, small after-effects, low densities, suitability for the application thereto of solderable metal coatings and good chemical stability.

In view of the fact that in the method of preparing the glasses for application of the solderable metal coatings the burning in with solutions of various metals has gained wide acceptance and that in this procedure, the glass must be heated to 500°C and above, it is extremely advantageous and in fact necessary that the glasses have transformation temperatures about 500°C.

A number of different glasses including the following have already become known which exhibit a low temperature coefficient of the time of propagation of ultrasonic waves:

a. glasses having a high-lead content. These are characterized by a low attenuation (value of the logarithmic decrement = $0.5 \times 10^{-3}$) and a relatively low transverse velocity of sound amounting to 2500-2600 m/sec. The transformation temperatures of such glass types are, however, in the range of 470 – 480°C and are thus too low to prove satisfactory for the burning in required connection with the application of metal to the glass coatings. In addition, the elevated density of these glasses ($\delta > 3.6$) constitutes a disadvantage in view of the fact that the weight of the delayed action line should be as small as possible.

b. glass containing no lead or a low percentage of lead and having a titanium content in excess of 2.0 wt percent. These glasses exhibit a higher velocity of sound and a greater inner attenuation. Even though this may be of interest, particularly in those instances in which transformers having a high efficiency and a solder layer characterized by low losses can be used as a result of the higher attenuation (values of the logarithmic decrement = $1.0$ to $2.5 \times 10^{-3}$), interfering signals in the glass body are suppressed by undesired reflections. However, these glasses have transformation temperatures amounting to 500 – 540°C so that they can be employed more advantageously for a burning in metalization.

It is accordingly an object of the invention to provide a new field of glass compositions of the character described.

It is another object of the invention to provide improved ultrasonic delayed action line glass compositions.

A further object is to provide new glasses meeting the above objects and being characterized by low internal deadening or muffling of sound waves and transformation temperatures of between 550 and 620°C.

Other objects and various further features of novelty and invention will be pointed out or will occur to those skilled in the art from a reading of the following specification.

In accordance with the invention it has now been found that glasses having the compositions as hereinafter set out can be used most advantageously for ultrasonic delayed action lines:

| | |
|---|---|
| $SiO_2$ | 54.4 – 59.8 wt-% |
| $B_2O_3$ | 0 – 3 wt-% |
| $K_2O$ | 7.3 – 13.0 wt-% |
| BaO | 12 – 15.7 wt-% |
| ZnO | 6.7 – 9.7 wt-% |
| PbO | 0 – 15.7 wt-% |

The glasses of the invention have a low temperature coefficient of the time of propagation of ultrasonic waves with frequencies in the megacycle range. They are characterized by a low internal attenuation (values of the logarithmic decrement of 0.5 to $1.0 \times 10^{-3}$) and a relatively low velocity of sound and, at the same time, their transformation temperature lies between 500 and 620°C. In addition, the density of such glasses is lower than that of the glasses having a high lead-oxide content.

In accordance with one feature of the invention, it is possible, by including in the glass compositions, small amounts of $B_2O_3$ ( 3 percent by weight), to shift the temperature minimum of the change in the time of propagation to a desired temperature without substantially altering the internal attenuation. It is also possible to replace in the known manner a part of the $K_2O$ by the corresponding molar amounts of $Li_2O$ or $Na_2O$; this interchange should however be avoided to prevent impairing the thermal aftereffect.

For the purpose of crystallization stabilization there may be introduce 0 – 3 percent by weight $Al_2O_3$; 0 – 2 percent by weight $Sb_2O_3$; 0 – 2 percent by weight $As_2O_3$ and/or 0 – 3 percent by weight $WO_3$. For the purpose of increasing the chemical stability, it is possible to introduce 0–2 percent by weight $TiO_2$.

In the following table there are set out illustrative glasses according to the invention, the same are not, however, to be construed as limiting the scope of the invention.

TABLE I

| OXIDES | 1 | 2 | 3 | 4 |
|---|---|---|---|---|
| $SiO_2$ | 59.8 | 57.6 | 54.9 | 54.4 |
| $B_2O_3$ | 3.0 | | | |
| $K_2O$ | 11.0 | 13.0 | 7.3 | 8.4 |
| BaO | 19.3 | 12.0 | 13.8 | 13.6 |
| ZnO | 6.7 | 8.0 | 8.7 | 7.6 |
| PbO | | 7.1 | 14.3 | 15.7 |
| $TiO_2$ | | 2.0 | 0.5 | |
| $As_2O_3$ | 0.2 | 0.3 | 0.5 | 0.3 |
| log. decrement $\cdot 10^3$ | 0.7 | 0.8 | 0.6 | 0.5 |
| $v_{trans}$ (m/sec) | 3093 | 2934 | 2880 | 2838 |
| Transformation Temperature (°C) | 612 | 579 | 584 | 563 |
| Specific Gravity (g/cc) | 2.85 | 2.91 | 2.13 | 3.15 |
| $[1/z (dz/dT)]10^6$/°C (10°–50°C) | 1.2 | 1.0 | 1.5 | 0.9 |

By using piezoceramic transformers, of lead zirconate-titanate, delay lines having a delay time of 64 microseconds were prepared from the glasses 1 to 4 of Table I. In the drawing attached hereto the influence of the temperature on the delay time expresses as $\Delta z$ in nanoseconds is set out.

The glass compositions according to the invention can be prepared for instance, as follows:

A mixture comprising the following components is prepared.

| Oxides | Wt. % | Raw Materials | Wt-portion 100 liters |
|---|---|---|---|
| $SiO_2$ | 54.4 | $SiO_2$ | 196.232 kg |
| $K_2O$ | 5.0 | $K_2CO_3$ | 26.510 kg |
| $K_2O$ | 3.4 | $KNO_3$ | 26.294 kg |
| BaO | 13.6 | $BaCO_3$ | 63.418 kg |
| ZnO | 7.6 | ZnO | 27.426 kg |
| PbO | 15.7 | $Pb_3O_4$ | 57.854 kg |
| $As_2O_3$ | 0.2 | $As_2O_3$ | 0.721 kg |

The carefully blended mixture is then placed for about 16 hours (for 100 liters) at 1380 – 1400°C into a crucible made of platinum or into refractory ceramic crucibles or into tank furnaces of refractory ceramic material (continuous glass melting furnaces). The fining time at 1440°C amounts to approximately 14 hours. The casting temperature amounts to approximately 1300°C. The cooling time may be selected arbitrarily to amount to 10°; 7° or 5°C per hour.

This type of glass is particularly well suited for manufacture utilizing continuous glass-melting furnaces, known to the skilled in the art. The fusing temperatures required must be adapted to the volume and the desired output rate as needed for blocks or pressed items.

What is claimed:

1. A glass composition adapted for use as ultrasonic delayed action lines having a low internal attenuation, a relative change of the propagation time $z$ of the sound in the temperature range of about 10 to 50°C of $(1/z)(dz/dt) \leq 1.5 \times 10^{-6}/°C$ and a transformation temperature of between 550 and 620°C consisting essentially of:

| | |
|---|---|
| $SiO_2$ | 54.4 – 59.8 wt % |
| $B_2O_3$ | 0 – 3 wt % |
| $K_2O$ | 7.3 – 13.0 wt % |
| BaO | 12.0 – 19.3 wt % |
| ZnO | 6.7 – 8.7 wt % |
| PbO | 0 – 15.7 wt % |
| TiO | 0 – 2 wt % |
| $Al_2O_3$ | 0 – 3 wt % |
| $Sb_2O_3$ | 0 – 2 wt % |
| $As_2O_3$ | 0 – 2 wt % |
| $WO_3$ | 0 – 3 wt % |

2. A glass composition according to claim 1 comprising:

| | |
|---|---|
| $SiO_2$ | 59.8 wt % |
| $B_2O_3$ | 3.0 wt % |
| $K_2O$ | 11.0 wt % |
| BaO | 19.3 wt % |
| ZnO | 6.7 wt % |
| $As_2O_3$ | 0.2 wt % |

3. A glass composition according to claim 1 comprising:

| | |
|---|---|
| $SiO_2$ | 57.6 wt % |
| $K_2O$ | 13.0 wt % |
| BaO | 12.0 wt % |
| ZnO | 8.0 wt % |
| PbO | 7.1 wt % |
| $TiO_2$ | 2.0 wt % |
| $As_2O_3$ | 0.3 wt % |

4. A glass composition according to claim 1 comprising:

| | |
|---|---|
| $SiO_2$ | 54.4 wt % |
| $K_2O$ | 8.4 wt % |
| BaO | 13.6 wt % |
| ZnO | 7.6 wt % |
| PbO | 15.7 wt % |
| $As_2O_3$ | 0.3 wt % |

5. A glass composition according to claim 1 comprising:

| | |
|---|---|
| $SiO_2$ | 54.9 wt % |
| $K_2O$ | 7.3 wt % |
| BaO | 13.8 wt % |
| ZnO | 8.7 wt % |
| PbO | 14.3 wt % |
| $TiO_2$ | 0.5 wt % |
| $As_2O_3$ | 0.5 wt % |

* * * * *

PO-1050
(5/69)

UNITED STATES PATENT OFFICE
CERTIFICATE OF CORRECTION

Patent No. 3,723,143  Dated March 27, 1973

Inventor(s) MARGA FAULSTICH ET AL

It is certified that error appears in the above-identified patent and that said Letters Patent are hereby corrected as shown below:

Front page, in the Abstract, following the last line, the following should be added:

| | | |
|---|---|---|
| --$SiO_2$ | 54.4 - 59.8 | wt. % |
| $B_2O_3$ | 0 - 3 | wt. % |
| $K_2O$ | 7.3 - 13.0 | wt. % |
| BaO | 12.0 - 19.3 | wt. % |
| ZnO | 6.7 - 8.7 | wt. % |
| PbO | 0 - 15.7 | wt. % |
| $TiO_2$ | 0 - 2 | wt. % |
| $Al_2O_3$ | 0 - 3 | wt. % |
| $Sb_2O_3$ | 0 - 2 | wt. % |
| $As_2O_3$ | 0 - 2 | wt. % |
| $WO_3$ | 0 - 3 | wt. % -- |

Col. 1, line 43; delete "in" before "required"
insert "in" between "required and "connection".

Col. 2, line 17, "12 - 15.7 wt. %" should read --12 - 19.3 wt.%--

Claim 1, line 13, "TiO" should read --$TiO_2$--

Signed and sealed this 20th day of November 1973.

(SEAL)
Attest:

EDWARD M. FLETCHER, JR.
Attesting Officer

RENE D. TEGTMEYER
Acting Commissioner of Patents